(12) United States Patent
Chuang et al.

(10) Patent No.: US 7,564,514 B2
(45) Date of Patent: Jul. 21, 2009

(54) BACKLIGHT MODULE AND BACK BEZEL

(75) Inventors: Hsing-Jung Chuang, Hsinchu (TW);
Yi-Jing Wang, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 202 days.

(21) Appl. No.: 11/654,705

(22) Filed: Jan. 18, 2007

(65) Prior Publication Data
US 2008/0068528 A1  Mar. 20, 2008

(30) Foreign Application Priority Data
Sep. 14, 2006 (TW) ............................. 95134029 A

(51) Int. Cl.
*G02F 1/1333* (2006.01)
*G02F 1/1335* (2006.01)

(52) U.S. Cl. .............................. 349/58; 349/61; 349/62; 349/67; 349/104; 349/113

(58) Field of Classification Search .................. 349/58, 349/61, 62, 67, 104, 113
See application file for complete search history.

(56) References Cited

U.S. PATENT DOCUMENTS

2001/0050741 A1* 12/2001 Hokazono et al. ........... 349/137
2005/0099806 A1* 5/2005 Tsai ............................ 362/218
2006/0146558 A1   7/2006 Chen et al.
2007/0200979 A1* 8/2007 Rudin et al. ................. 349/106

OTHER PUBLICATIONS

Chinese Office Action dated Nov. 30, 2007 (7 pages).

\* cited by examiner

*Primary Examiner*—Frank G Font
*Assistant Examiner*—Jerry Blevins
(74) *Attorney, Agent, or Firm*—Holland & Knight LLP; Brian J. Colandreo, Esq.

(57) ABSTRACT

A backlight module is provided. The backlight module comprises a light source, a reflection panel, a back bezel, and an upper filtering apparatus. The reflection panel has a first upper portion, which is essentially disposed at an outer side of the light source, and is used to reflect lights projecting from the light source. The back bezel has a second upper portion which is essentially disposed at an outer side of the reflection panel. At least one of the first upper portion and the second upper portion forms an upper opening. The filtering apparatus covers the openings. The filtering apparatus is capable of changing the distribution of the temperature of the light source to allow more efficient lamp activity. As a result, luminance is increased and lamp life extended.

14 Claims, 11 Drawing Sheets

US 7,564,514 B2

BACKLIGHT MODULE AND BACK BEZEL

This application claims priority to Taiwan Patent Application No. 095134029 filed on Sep. 14, 2006, the disclosures of which are incorporated herein by reference in its entirety.

CROSS-REFERENCES TO RELATED APPLICATIONS

Not applicable.

BACKGROUND OF THE INVENTION

1. Field of the Invention

The present invention relates to a backlight module. More particularly, the present invention relates to a backlight module with an upper filtering apparatus so that a larger proportion of a light source can operate under a better working temperature.

2. Description of the Related Arts

In recent years, techniques of manufacturing liquid crystal display (LCDs) have been quickly developed to equip many electronic products, such as personal digital assistants, notebooks, digital cameras, digital camcorders, mobile phones, computer monitors, LCD TVs, etc, with LCDs. An LCD requires the light source of a backlight module to display. Consequently, the quality of the light source of the backlight module is highly related to the quality of the LCD.

Based on the light source positioning in backlight modules, backlight modules can be roughly classified into edge type backlight modules and direct-type backlight modules. Lamps of an edge type backlight module are disposed on one side of an LCD panel. The lamp lights are propagated into a light guiding plate disposed in the rear of the LCD panel to guide reflection and refraction of the incident lights, using the light guiding plate as a medium.

The direct type backlight module comprises a back bezel, a reflection panel, a plurality of lamps, a diffuser, and an optical film set. The back bezel forms a container. The reflection panel is disposed inside the container. The lamps are arranged in the container and are disposed on the inner side of the reflection panel. The diffuser is disposed on the inner side of the lamps, while the optical film set is disposed on the inner side of the diffuser. The optical film set usually comprises a prism, a diffuser sheet, or a brightness enhancement film. The LCD panel is disposed on the inner side of the optical film set. The assembly of these components results in a complete LCD.

The temperature of a lamp surface influences the quality of a direct type backlight module greatly. Understandably, different types of lamps have different ranges of optimal working temperatures. If there are more lamps with temperatures that fall within the range, the luminance of the backlight module is more uniform, resulting in a longer lamp life. However, the heat generated by the lamps increases the temperature inside the backlight module, so fewer lamps are able to operate at their optimal working temperatures. Furthermore, since hot air rises, lamps disposed in the upper areas suffer from higher temperatures. This causes serious damages to the overall lighting quality and lifetime of the lamps.

In the prior art, an opening is disposed on the back bezel of a backlight module to release hot air. Although this method can reduce heat, no more adjustments can be made after the opening is disposed. Furthermore, external dust and extraneous particles may easily fall inside the backlight module through the opening, reducing the quality of the backlight module.

In response to the above-mentioned concerns, an invention that (1) reduces the hot air in a direct type backlight module, (2) prevents external particles from entering and changing the temperature distribution of the lamps and, (3) increases both the overall light efficiency of the light sources and the usage life is greatly needed in this field.

SUMMARY OF THE INVENTION

The primary objective of this invention is to provide a backlight module that reduces the concentration of hot air in the upper portion of the apparatus and to prevent external particulates from entering. This backlight module comprises a light source, a reflection panel, a back bezel, and an upper filtering filter. The reflection panel has a first upper portion and is essentially disposed at an outer side of the light source to reflect lights projecting from the light source. In addition, the back bezel has a second upper portion and is essentially disposed at an outer side of the reflection panel, wherein at least one of the first upper portion and the second upper portion is formed with an upper opening, and the upper filtering device covers the upper opening.

Another objective of this invention is to provide a back bezel for a backlight module of an LCD to reduce the concentration of hot air at an upper portion and to prevent external particulates from entering. The backlight module comprises a light source and a reflection panel. The reflection panel is essentially disposed at an outer side of the light source to reflect lights projecting from the light source and having a first upper portion, wherein the back bezel is essentially disposed at an outer side of the reflection panel. The back bezel has a second upper portion and an upper filtering device. At least one of the first upper portion and the second upper portion is formed with an upper opening to allow the accumulated hot air to escape. The upper filter device covers the upper opening.

The difference between this invention and the prior art is that an opening is formed at the appropriate places in the backlight module to allow hot air to flow through the device quickly. Since there is an upper filtering device, external particulates are not able to enter the device. Understandably, the best position for the opening is in the upper portion of the backlight module. When the hot air is released, more lamps are able to work within their optimal temperature ranges, resulting in better luminance and a longer backlight module life.

The embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
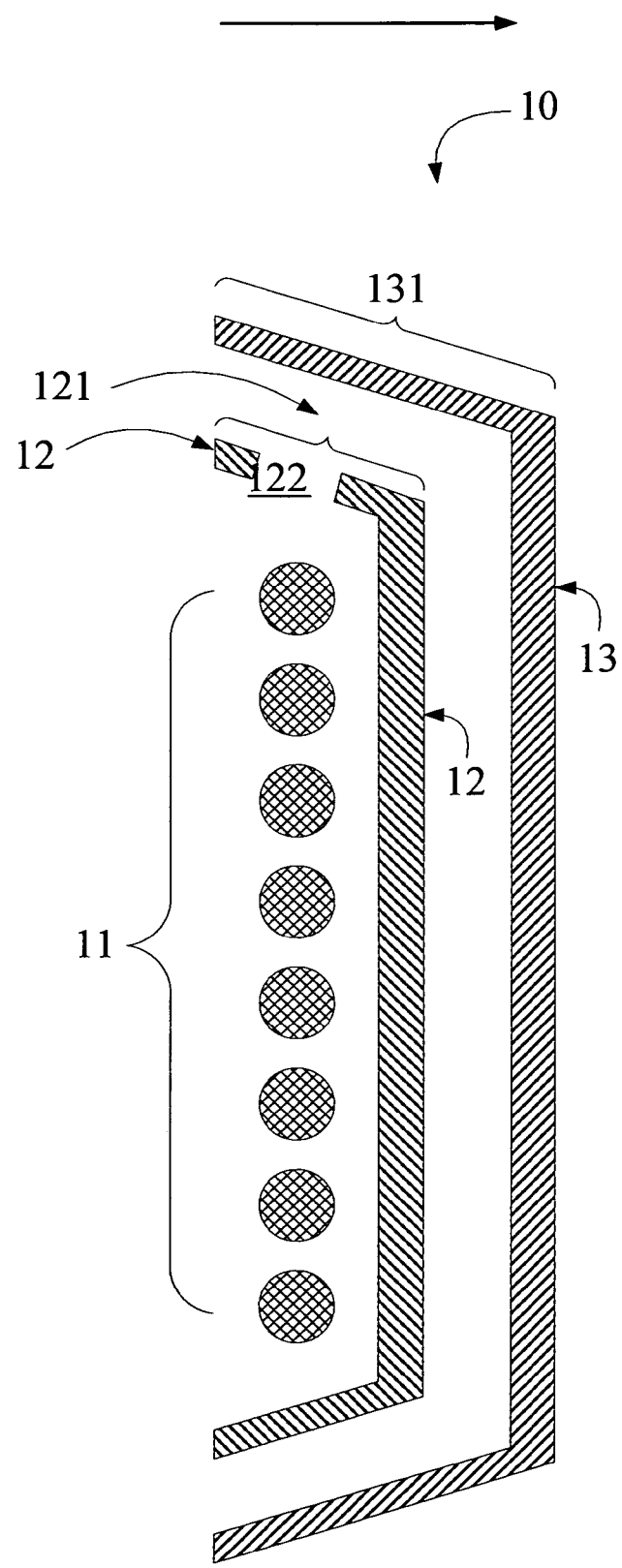
FIG. 1A is a lateral cross-sectional view of a backlight module without its filtering device covered in the first embodiment of the present invention.

A first embodiment of the present invention is a backlight module with an upper filtering device covering an upper opening of an upper portion of a reflection panel. Referring to FIG. 1A, the backlight module 10 comprises 8 Cold Cathode Fluorescent Lamps (CCFLs) 11, a reflection panel 12, and a back bezel 13. The indication of the arrow means the referenced outward direction. The reflection panel 12 is disposed at an outer side of the 8 CCFLs 11, while the back bezel 13 is disposed at an outer side of the reflection panel 12. The reflection panel 12 has a first upper portion 121 with an upper opening 122. In addition, the back bezel 13 has a second upper portion 131.

Figure 1B:
FIG. 1B is an enlarged lateral cross-sectional view of a first upper portion of the first embodiment.
Figure 1C:
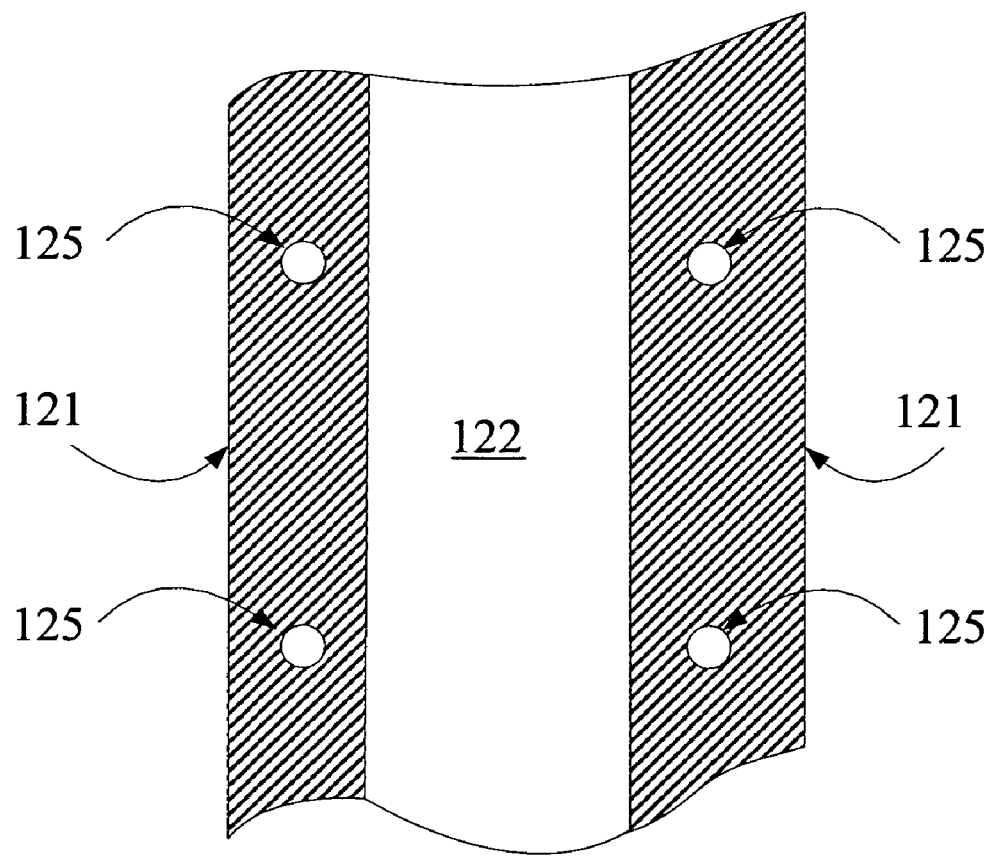
FIG. 1C is a top cross-sectional view of FIG. 1B.

FIG. 1B is an enlarged lateral cross-sectional view of the first upper portion 121 and the corresponding upper opening 122 of this embodiment. FIG. 1C is a top cross-sectional view of FIG. 1B. Looking at FIG. 1C, the upper opening 122 completely extends along the first upper portion 121. Meanwhile, the first upper portion 121 comprises four screw holes 125.

Figure 1D:
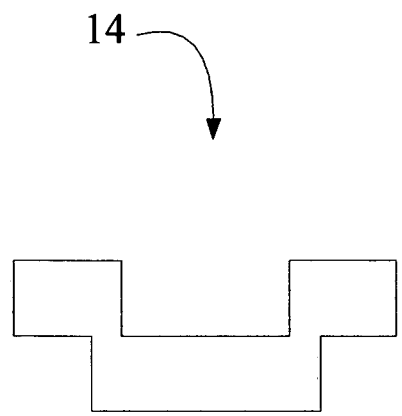
FIG. 1D is a lateral cross-sectional view of an upper filtering device of the first embodiment.
Figure 1E:
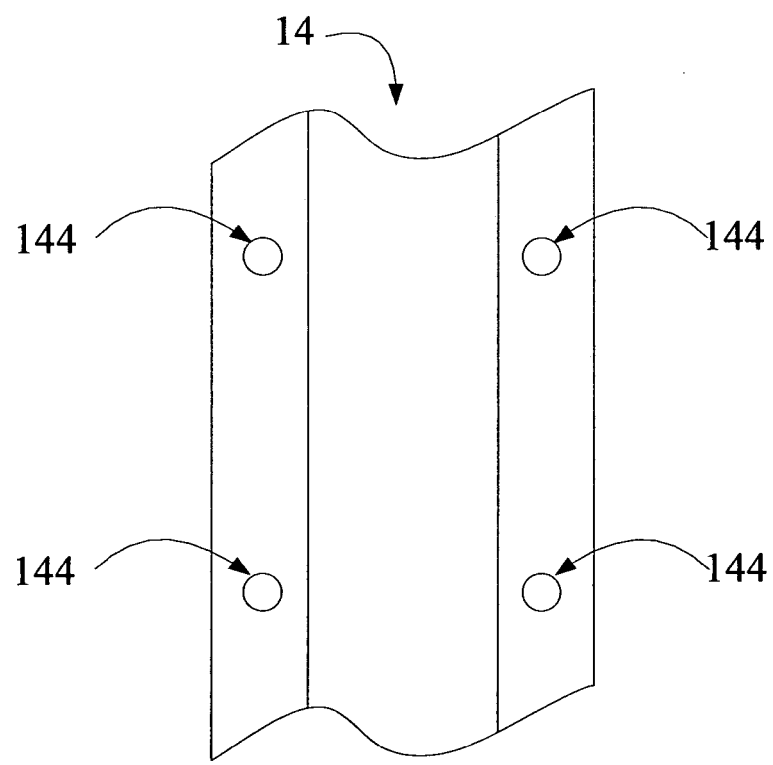
FIG. 1E is a top cross-sectional view of FIG. 1D.

FIG. 1D is a lateral cross-sectional view of the upper filtering device 14 of this embodiment. FIG. 1E is a top cross-sectional view of FIG. 1D. In this embodiment, a filter area of the upper filtering apparatus 14 is close to an area of the upper opening 122. The filter is single layered and is made of copper with a 0.1 mm mesh. The upper filtering device is disposed with four screw holes 144 corresponding to the screw holes 125 of the first upper portion 121, respectively.

Figure 1F:
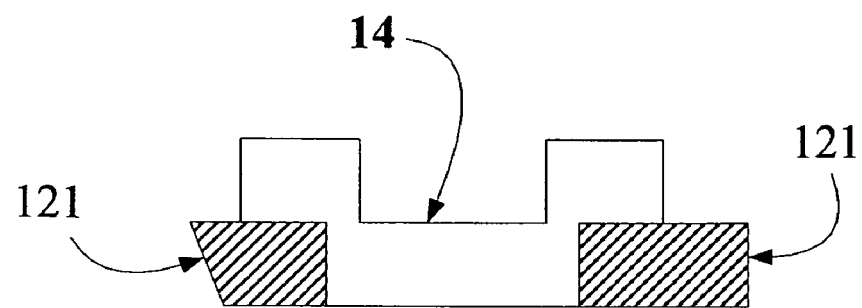
FIG. 1F is an enlarged lateral cross-sectional view of a first upper portion with a covered filtering device of the first embodiment.
Figure 1G:
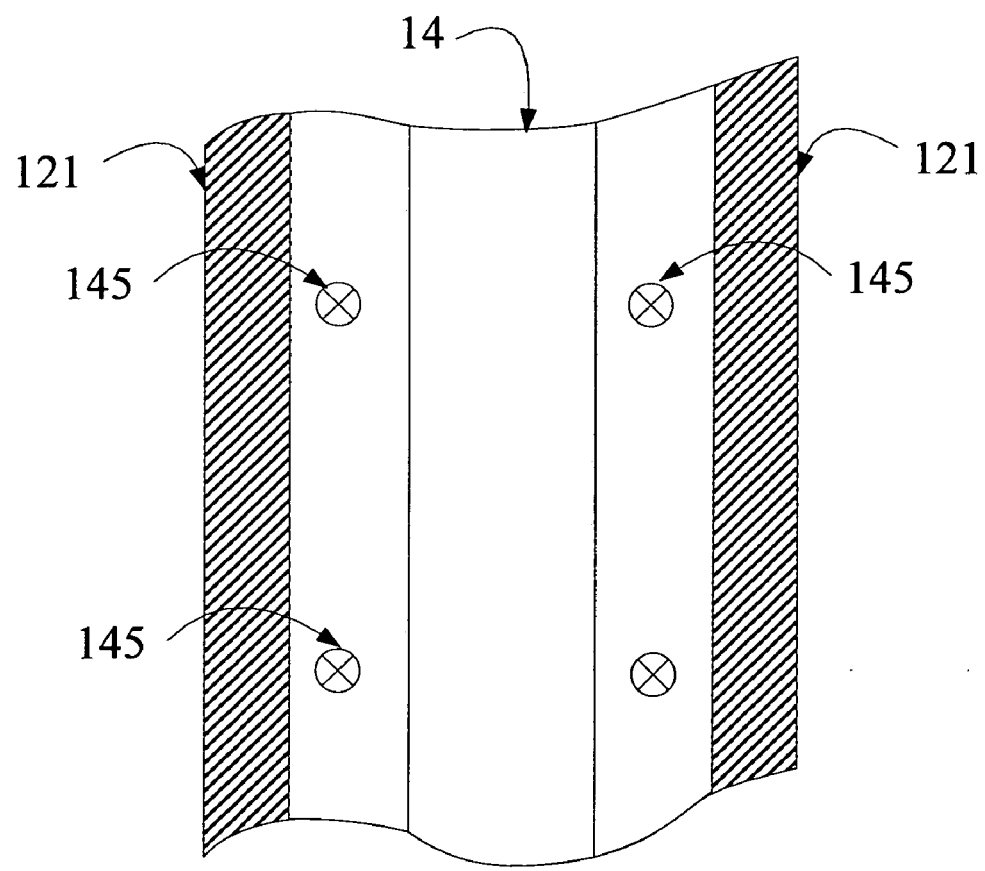
FIG. 1G is a top cross-sectional view of FIG. 1F.
Figure 1H:
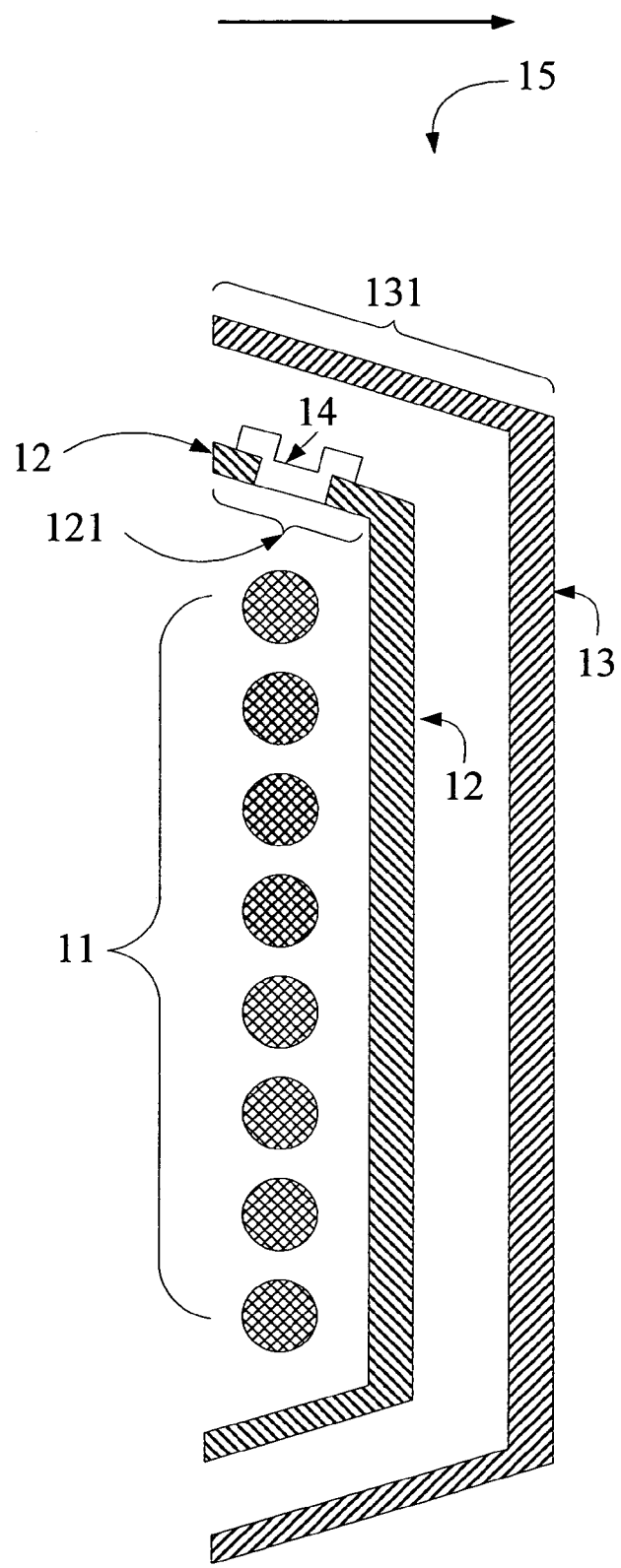
FIG. 1H is a lateral cross-sectional view of a backlight module with a covered filtering device of the first embodiment.

Next, the filtering device 14 is fixed to the first upper portion 121 by screws. FIG. 1F is a lateral cross-sectional view of the upper opening 122 covered by the upper filtering device 14. FIG. 1G is a top cross-sectional view of FIG. 1F. Referring to FIG. 1G, four screws 145 fix the upper filtering device 14 onto the first upper portion 121 to cover the upper opening 122. FIG. 1H depicts a lateral cross-sectional view of the backlight module covered with the upper filtering device 14. Similarly, the indication of the arrow means the referenced outward direction.

With the above arrangements, hot air in the backlight module 15 covered by the upper filter device 14 can be released. Consequently, more lamps can operate in their optimal working temperature ranges, resulting in better luminance of the back light module 15. In addition, lifetimes of lamps 11 are increased.

It is necessary to emphasize that the objective of this invention is to control the hot air in the backlight module and the temperature distribution caused by heat generated from the lamps through the filtering device. Consequently, a fixing manner, a material, a size, a shape, a quantity, a mesh size, a number of the filter stacks used in the upper opening, as well as a number, a shape and a position of the filtering device are not used to limit the range of this invention. Any other substitution is applicable as shown in the following examples.

Figure 2A:
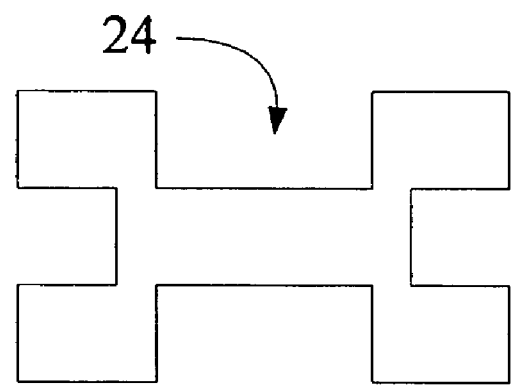
FIG. 2A is a lateral cross-sectional view of a filtering device with a slot.
Figure 2B:
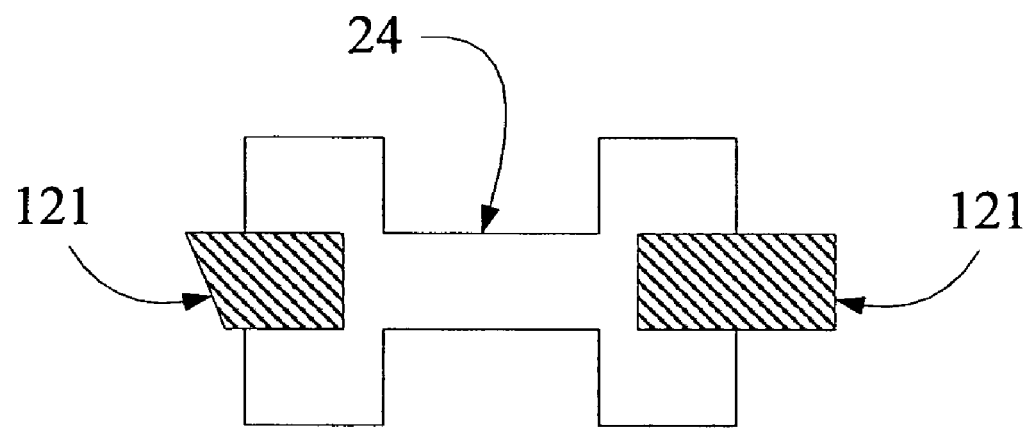
FIG. 2B is a lateral cross-sectional view of a first upper portion of a filtering device with a slot.

For example, instead of being screwed on, the filtering device can be substituted by a filtering device with a slot FIG. 2A is a lateral cross-sectional view of the filtering apparatus 24 with a slot. By using the slot, the filtering device 24 can be fixed onto the first upper portion 121 by sliding as depicted in FIG. 2B. By using this approach, the filtering device can be easily replaced easily or taken out for cleaning.

With regards to the type of material, a stainless steel, a nylon, a polypropylene, a glass fiber, or any combination of the above can replace the above-mentioned copper. Because the filtering device may be disposed above the upper opening 122 of the first upper portion 121 of the reflection panel 12, a light collecting ability of the original reflection panel 12 can be kept if the filtering device is made of a light reflection material. The mesh size may range from 0.1 mm to 0.5 mm. Likewise, the filter stacks could be single-layered or multiple-layered. If there are multiple filter stacks, each mesh layer can be staggered to achieve a better result for isolating the suspended particulates, while still maintaining heat circulation. Certainly, there is no limitation in selecting the mesh size and the material.

Figure 2C:
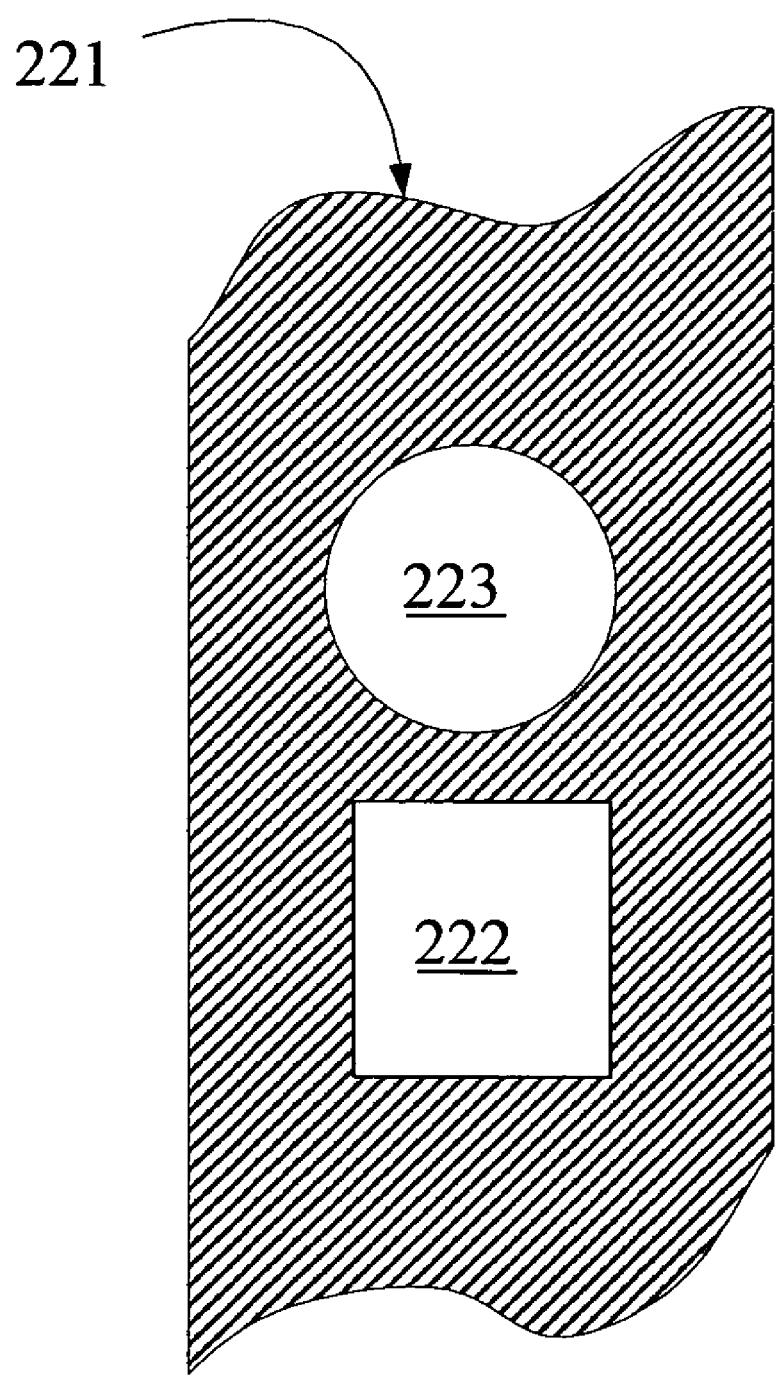
FIG. 2C is a top cross-sectional view of another upper portion.

For the number, shape and position of the upper opening, various opening shapes may be adopted. FIG. 2C is a top cross-sectional view of another upper portion 221. In the figure, the first upper portion 221 forms two upper openings 222 and 223. This diagram shows that the shape and the fixing manner of the filtering device are adjustable. In addition, the upper opening can be disposed on the upper portion of the back bezel corresponding to the opening of the reflection panel.

Figure 3:
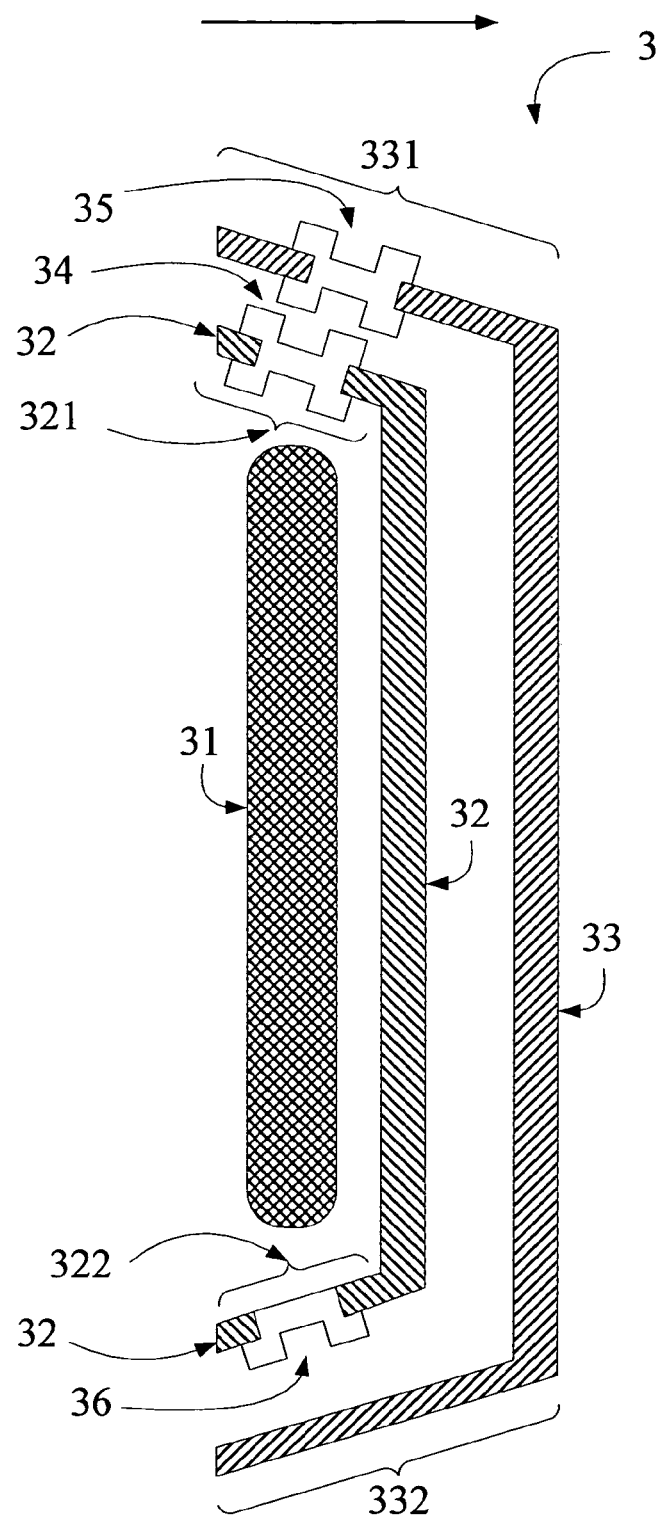
FIG. 3 is a lateral cross-sectional view of the second embodiment.

FIG. 3 depicts a second embodiment of this invention disposing a backlight module comprising two upper filtering devices and a lower filtering device. The backlight module 3 comprises a Cold Cathode Flat Fluorescent Lamp (CCFFL) 31, a reflection panel 32, a back bezel 33, a first upper filtering device 34, a second upper filtering device 35, and a lower filtering device 36. The reflection panel 32 has a first upper portion 321 and a first lower potion 322, wherein the first upper portion 321 forms a first upper opening, while the first lower portion 322 forms a lower opening. The back bezel 33 has a second upper portion 331 and a second lower portion 332, wherein the second upper portion 331 forms a second upper opening.

The first upper filtering device 34 is slid into the first upper opening. The second upper filtering device 35 is also slid into the second upper opening. The lower filtering device 36 is screwed at the lower opening.

Similarly, a fixing manner, a material, a size, a shape, a quantity, a mesh size, a number of filter stacks of the filter device, as well as a number, a shape and a position of the upper opening are not used for limiting this invention. Any other suitable substitution is applicable.

Figure 4:
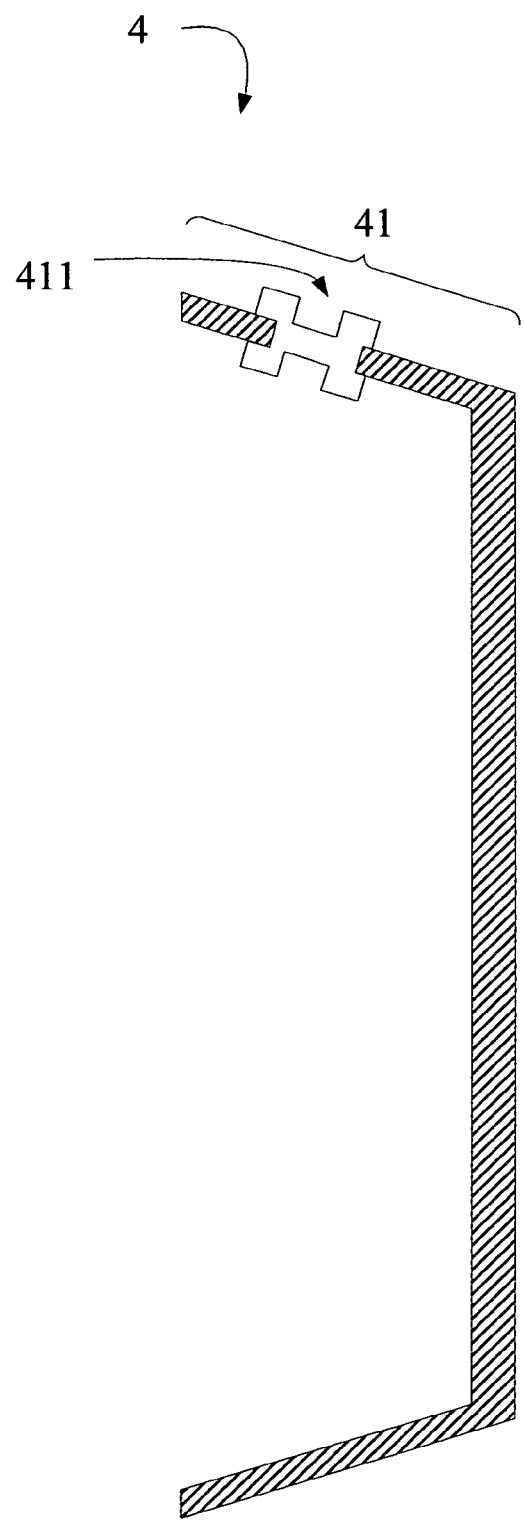
FIG. 4 is a lateral cross-sectional view of the third embodiment.

FIG. 4 is a lateral cross-sectional view of a third embodiment of this invention which is a back bezel 4. The back bezel 4 is suitable for a backlight module of an LCD. An upper portion 41 of the back bezel 4 forms an upper opening. The back bezel 4 comprises an upper filtering device 411 covered on the upper opening. Consequently, while the back bezel 4 is assembled with the backlight module, hot air inside the backlight module can be released from the upper filtering device 411 of the back bezel 4. Similar to the first and second embodiments as stated above, in this embodiment the ways to implement the upper filtering device 411 onto the back bezel 4 can be of different forms to achieve the desired purposes.

Figure 5:
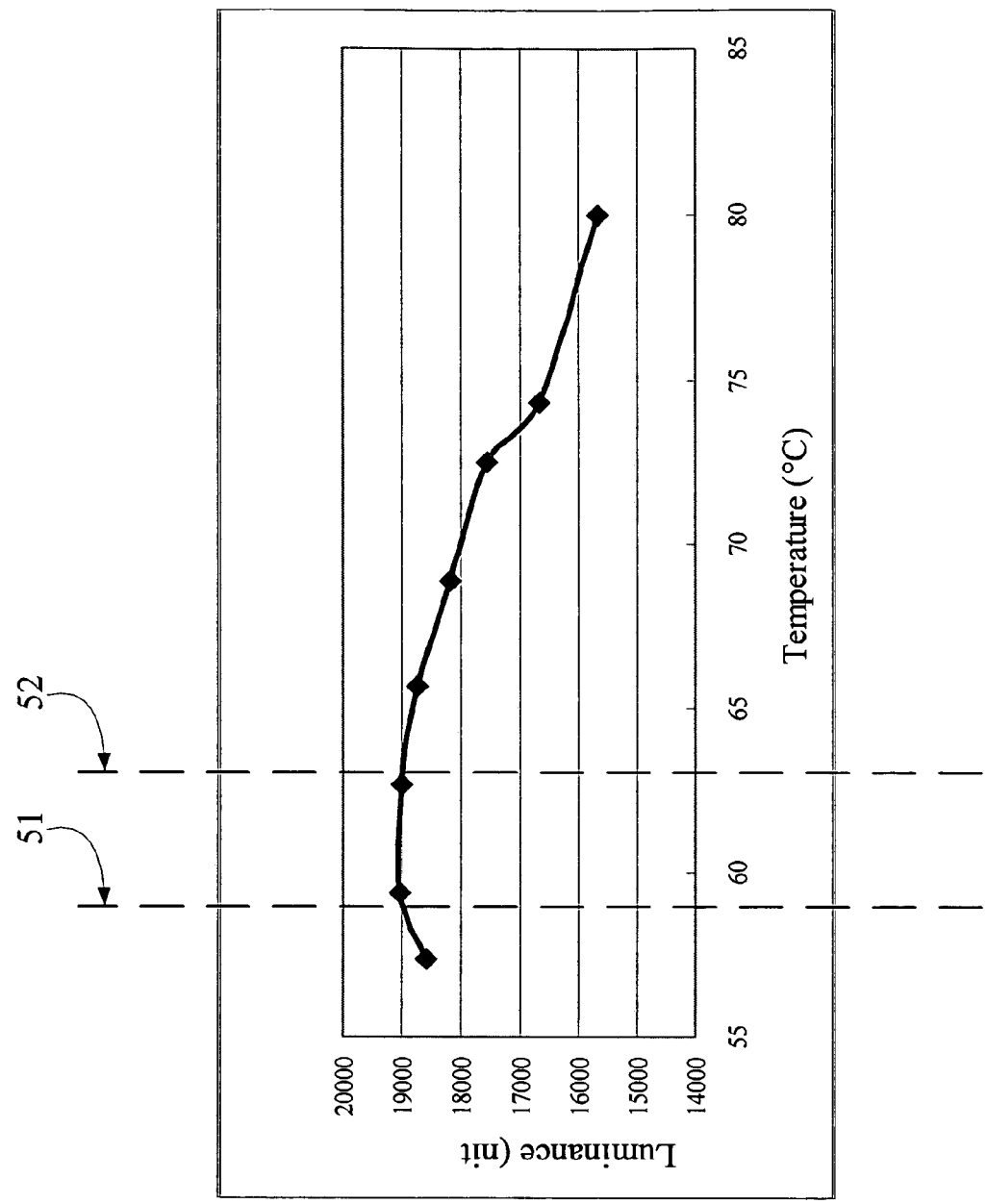
FIG. 5 is a diagram of a distribution of a lamp surface temperature.

FIG. 5 is a diagram of a lamp surface temperature distribution, wherein the horizontal direction axis represents the lamp surface temperature, while the vertical direction axis represents the luminance. A dotted line 51 indicates a position of the lamp surface temperature of about 59° C., while a dotted line 52 indicates a lamp surface temperature of about 63° C. According to FIG. 5, the optimal luminance range for lamps ranges from 59° C. to 63° C. regardless of a current of the lamp. That is, the luminance of the lamp is higher and more uniform when the lamp is in its optimal operating range.

Because an objective of this invention is to increase the light emitting efficiency and life, the ratio of more efficient lamps should also increase. In other words, if more lamps work in a temperature range of around 65° C. to 75° C., the light emitting efficiency of the whole backlight module can be increased and a relative heating degree among the lamps can be balanced to indirectly extend the life of the lamps.

Figure 6:
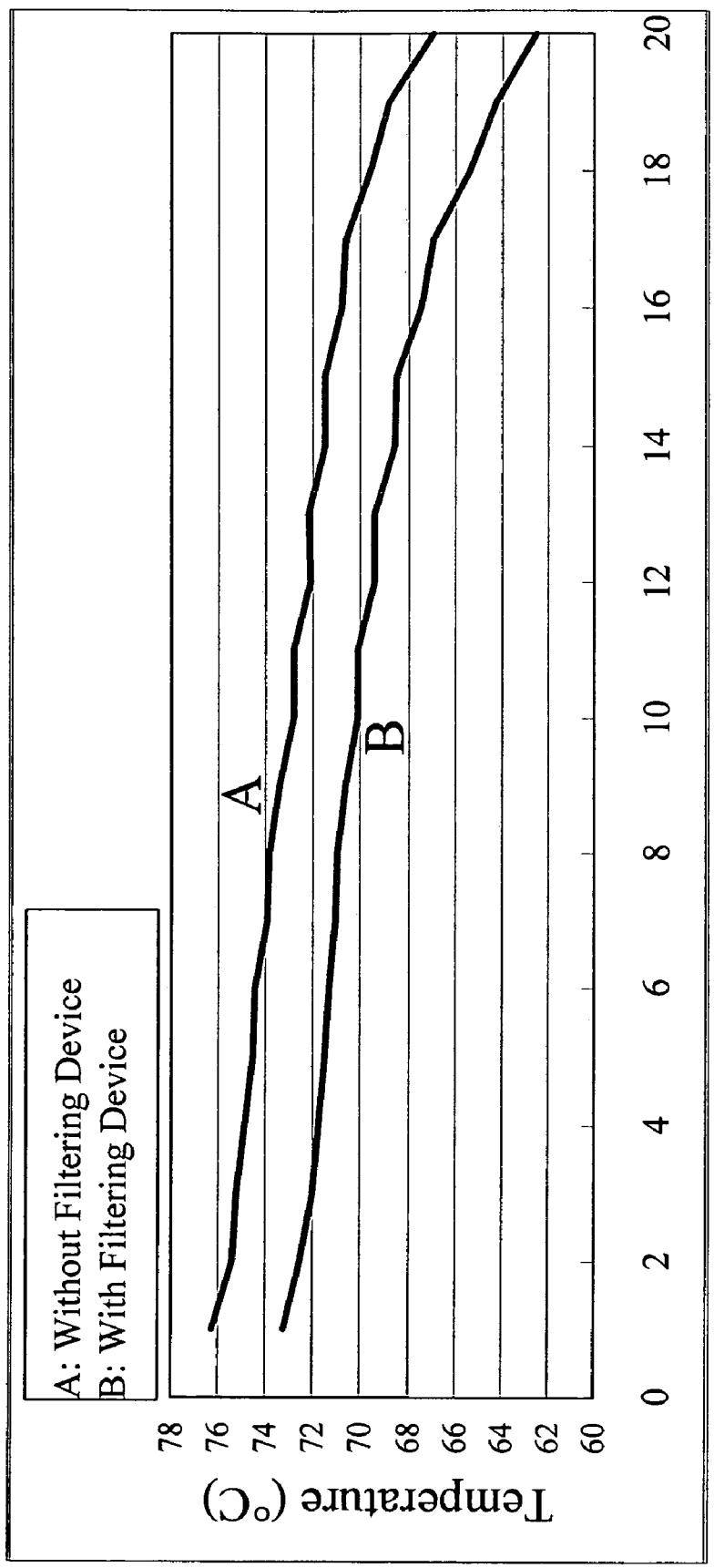
FIG. 6 is a comparison diagram of a lamp surface temperature of a backlight module with or without a filtering device.

FIG. 6 is a comparison diagram of the lamp surface temperature of a backlight module with or without a filtering device (curve A and B, respectively). The horizontal direction axis represents the numbering of the lamps from top to bottom, while the vertical direction axis represents the lamp surface temperature. For a more detailed description, two backlight modules are deposed with 20 lamps, wherein the lamp with number 1 is located at the highest position of the backlight module, and the lamp with number 20 is located at the lowest position. In the figure, an average temperature of the lamps of the backlight module deposed with the filtering device decreases about 3° C. In other words, most lamps have a surface temperature ranging from 59° C. to 63° C. Based on this finding, it is not hard to imagine that the lamps may have better light emitting efficiency, longer lifetime and uniform luminance.

From the above descriptions, the filtering device disposed on the back bezel or/and the reflection panel can reduce hot air in the backlight module, increase the light source luminance and uniformity, and also increase lamp life.

The above disclosure is related to the detailed technical contents and inventive features thereof. People skilled in this field may proceed with a variety of modifications and replacements, based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A backlight module, comprising:
    a light source;
    a reflection panel, having a first upper portion and being essentially disposed at an outer side of the light source to reflect lights projecting from the light source;
    a back bezel, having a second upper portion and being essentially disposed at an outer side of the reflection panel; and
    an upper filtering device;
    wherein at least one of the first upper portion and the second upper portion is formed with an upper opening, the upper opening extends along a total length of the first upper portion, and the upper filtering device covers the upper opening.

2. The backlight module of claim 1, wherein the reflection panel and the back bezel are essentially overlapped with each other, and wherein both of the first upper portion and the second upper portion are formed with upper openings, one of which is a first opening formed on the first upper portion and the other of which is a second opening formed on the second upper portion, and wherein at least part of the first opening and the second opening are overlapped with each other, and the upper filtering device covers at least one of the first opening and the second opening.

3. The backlight module of claim 1, wherein the upper opening extends along a total length of the second upper portion.

4. The backlight module of claim 1, wherein the upper filtering device has a mesh which is formed by substantially vertical and horizontal intervals each ranging between 0.1 mm and 0.5 mm.

5. The backlight module of claim 1, wherein the upper filtering device has a plurality of filters stacking with one another.

6. The backlight module of claim 1, wherein the upper filtering device is made of the materials selected from the group of copper, stainless steel, nylon, polypropylene, and fiberglass and the combination thereof.

7. The backlight module of claim 1, wherein the upper filtering device is made of an optical reflection material.

8. The backlight module of claim 1, wherein the upper filtering device is detachable from the upper opening.

9. The backlight module of claim 1, wherein at least one of the first upper portion and the second upper portion further includes a guiding device, which is disposed at an edge of the upper portion in order to conveniently engage and disengage the upper filtering device from the upper opening.

10. The backlight module of claim 1, wherein the upper filtering device engages with the at least one of the first upper portion and the second upper portion by screws.

11. The backlight module of claim 1, further comprising a bottom filtering device, wherein the reflection panel further has a first bottom portion, the back bezel further has a second bottom portion, at least one of the first bottom portion and the second bottom portion is formed with a bottom opening, and the bottom filtering device covers the bottom opening.

12. A back bezel for a backlight module of a liquid crystal display, the backlight module comprising:
    a light source;
    a reflection panel, being essentially disposed at an outer side of the light source to reflect lights projecting from the light source and having a first upper portion,
    wherein the back bezel is essentially disposed at an outer side of the reflection panel, the back bezel has a second upper portion and an upper filtering device, and
    at least one of the first upper portion and the second upper portion is formed with an upper opening so that hot air generated by the light source is adapted to flow through with an external of the back bezel via the upper opening, and the upper filtering device covers the upper opening,
    wherein the upper opening extends along a total length of the first upper portion.

13. A back bezel for a backlight module of a liquid crystal display, the backlight module comprising:
    an upper portion and an upper filtering device;
    wherein the upper portion is formed with an upper opening so that an inner side of the backlight module is adapted to connect with an external of the back bezel via the upper opening, and the upper filtering device covers the upper opening,
    wherein the upper opening extends along a total length of the first upper portion.

14. The back bezel of claim 13, wherein the back bezel is made of an optical reflection material.

* * * * *